US012216386B2

(12) United States Patent
Lee et al.

(10) Patent No.: US 12,216,386 B2
(45) Date of Patent: Feb. 4, 2025

(54) CAMERA LENS ASSEMBLY HAVING USER-DESIGNATED FUNCTIONS (71) Applicant: SAMYANG OPTICS CO., LTD, Changwon-si (KR)

(72) Inventors: Hyun Hee Lee, Seoul (KR); Ji Hoon Lee, Gunpo-si (KR)

(73) Assignee: SAMYANG OPTICS CO., LTD, Changwon-si (KR)

( * ) Notice: Subject to any disclaimer, the term of this patent is extended or adjusted under 35 U.S.C. 154(b) by 58 days.

(21) Appl. No.: 17/906,960

(22) PCT Filed: Mar. 24, 2020

(86) PCT No.: PCT/KR2020/003979
§ 371 (c)(1),
(2) Date: Sep. 21, 2022

(87) PCT Pub. No.: WO2021/193987
PCT Pub. Date: Sep. 30, 2021

(65) Prior Publication Data
US 2023/0375901 A1 Nov. 23, 2023

(51) Int. Cl.
G03B 17/14 (2021.01)
G03B 3/10 (2021.01)
(Continued)

(52) U.S. Cl.
CPC .............. G03B 17/14 (2013.01); G03B 3/10 (2013.01); G03B 13/34 (2013.01); H04N 23/60 (2023.01)

(58) Field of Classification Search
None
See application file for complete search history.

(56) References Cited

U.S. PATENT DOCUMENTS

2004/0114251 A1* 6/2004 Kaneda .................. G02B 7/102
359/694
2005/0225660 A1* 10/2005 Yoshikawa ............ G02B 7/102
348/335

(Continued)

FOREIGN PATENT DOCUMENTS

JP 2002-072051 A 3/2002
JP 2004163565 A * 6/2004

(Continued)

OTHER PUBLICATIONS

The extended European search report issued by the European Patent Office on Nov. 29, 2023, which corresponds to European Patent Application No. 20927538.7.

(Continued)

Primary Examiner — Clayton E. LaBalle
Assistant Examiner — Diana Hancock
(74) Attorney, Agent, or Firm — Studebaker & Brackett PC (57) ABSTRACT Provided are a camera lens assembly capable of communicating with a camera body and having a controller and a memory therein. The camera lens assembly includes a user interface through which functions represented by a plurality of modes are designated by a user, a switch for selecting one of the modes to which the functions have been designated, a switch detection unit for detecting the current mode of the switch, a manual ring detection unit for detecting the operation of a manual ring provided on the outside of the camera lens assembly so that the user can operate the manual ring by a rotating method; and a lens controller for, when the operation of the manual ring is detected, carrying out a designated function according to the detected current mode of the switch.

8 Claims, 5 Drawing Sheets (51) Int. Cl.
    *G03B 13/34*           (2021.01)
    *H04N 23/60*          (2023.01)

(56)                References Cited

U.S. PATENT DOCUMENTS

| | | | |
|---|---|---|---|
| 2016/0004143 A1* | 1/2016 | Asano | G03B 17/14 |
| | | | 348/360 |
| 2017/0099428 A1* | 4/2017 | Okuyama | G02B 7/102 |
| 2018/0234630 A1* | 8/2018 | Kondo | G06F 3/0482 |
| 2019/0011805 A1 | 1/2019 | Ota | |
| 2020/0019040 A1* | 1/2020 | Matsumoto | G03B 13/36 |
| 2020/0050085 A1* | 2/2020 | Hayakawa | G03B 17/14 |
| 2020/0073095 A1* | 3/2020 | Ino | G03B 3/10 |
| 2020/0077001 A1* | 3/2020 | Nakahara | G03B 5/00 |
| 2021/0157091 A1* | 5/2021 | Yamazaki | G02B 7/28 |
| 2021/0289191 A1* | 9/2021 | Sato | H04N 13/344 |

FOREIGN PATENT DOCUMENTS

| | | | |
|---|---|---|---|
| JP | 2007-108217 A | | 4/2007 |
| JP | 2007-108373 A | | 4/2007 |
| JP | 2012-063778 A | | 3/2012 |
| WO | 2020-031374 A1 | | 8/2021 |

OTHER PUBLICATIONS

International Search Report issued in PCT/KR2020/003979; mailed Dec. 15, 2020.

* cited by examiner

CAMERA LENS ASSEMBLY HAVING USER-DESIGNATED FUNCTIONS

CROSS-REFERENCE TO RELATED APPLICATIONS

This application is a U.S. National Stage of International Application No. PCT/KR2020/003979 filed Mar. 24, 2020, the entire content of which is incorporated herein by reference.

TECHNICAL FIELD

The present disclosure relates to a camera lens assembly having user-designated functions, and more particularly, to a technique for assigning a plurality of functions to a switch positioned on a camera lens assembly to utilize a rotatable manual ring, which is provided on the outside of the assembly, for different functions and to control various operations of a camera.

BACKGROUND ART

A manual ring of a conventional camera lens is generally used only for manual focusing. On the other hand, the manual ring is not used for automatic focusing of a camera. Therefore, there is a need for a method to increase the utilization of the manual ring already provided in a camera lens assembly. In addition, it is necessary to make it possible to switch to various modes by manipulating a switch provided on the camera lens assembly without manipulation on a camera body. In particular, the need is greater recently because the camera lens assembly is not necessarily manufactured by the same manufacturer as the camera body but can be compatibly coupled to various cameras by a signal transmission standard between them.

DISCLOSURE

Technical Problem

An objective to be achieved by at least one embodiment of the present disclosure is to make it possible to switch a manual ring function of a lens between various functions such as an aperture control function, automatic focusing, and manual focusing simply by using a switch on a camera lens assembly.

Another objective of the present disclosure is to enable a user to pre-define functions to be designated by the switch according to his or her preference through a user interface.

However, the objectives of the present disclosure are not restricted to the one set forth herein. The above and other objectives of the present disclosure will become more apparent to one of ordinary skill in the art to which the present disclosure pertains by referencing the detailed description of the present disclosure given below.

Technical Solution

According to an aspect of the present disclosure, there is provided a camera lens assembly capable of communicating with a camera body and having a controller and a memory therein, the camera lens assembly comprising: a user interface through which functions represented by a plurality of modes are designated by a user; a switch for selecting one of the modes to which the functions have been designated; a switch detection unit for detecting the current mode of the switch; a manual ring detection unit for detecting the operation of a manual ring provided on the outside of the camera lens assembly so that the user can operate the manual ring by a rotating method; and a lens controller for, when the operation of the manual ring is detected, carrying out a designated function according to the detected current mode of the switch, wherein the lens controller performs a first function when a first mode is selected from the modes by the switch and performs a second function when a second mode is selected from the modes by the switch, wherein the first function and the second function are different from each other.

The camera lens assembly may further comprise a memory for storing information about the functions designated by the user.

The camera lens assembly may further comprise a lens communication unit for transmitting at least one of the information about the functions stored in the memory, the detected current mode of the switch, and the operation state of the manual ring to the camera body.

The first function may be a function of adjusting an aperture unit provided in the camera lens assembly.

The second function may be a manual focusing function or an automatic focusing function.

The user interface may display options of the first function which can be designated to the first mode and options of the second function which can be designated to the second mode on a display and may be used by the user to select one of the options of the first function and one of the options of the second function.

The options of the first function and the options of the second function may include an aperture control function, a manual focusing function, and an automatic focusing function.

When one of the options of the first function is selected, the same option as the selected option among the options of the second function may be disabled.

The camera lens assembly may further comprise an additional switch provided separately from the switch, wherein the switch detection unit detects both the mode of the switch and the mode of the additional switch.

The switch may be formed on one of left and right sides of the outside of the camera lens assembly, and the additional switch is formed on the opposite side to the side.

The switch may be configured as a slider button, and the additional switch may be configured as a push toggle button.

Other details of the present disclosure are included in the detailed description and the drawings.

Advantageous Effects

In a camera lens assembly according to an embodiment of the present disclosure, a manual ring previously used only for manual focusing can be used for various functions such as an aperture operation and a zooming operation through simple manipulation by a user.

In addition, since a plurality of functions can be assigned to a single mode selection switch, the lens camera assembly can be produced at a relatively low cost.

However, the effects of the present disclosure are not limited to the aforementioned effects, and various other effects are included in the present specification.

MODE FOR INVENTION

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

Figure 1:
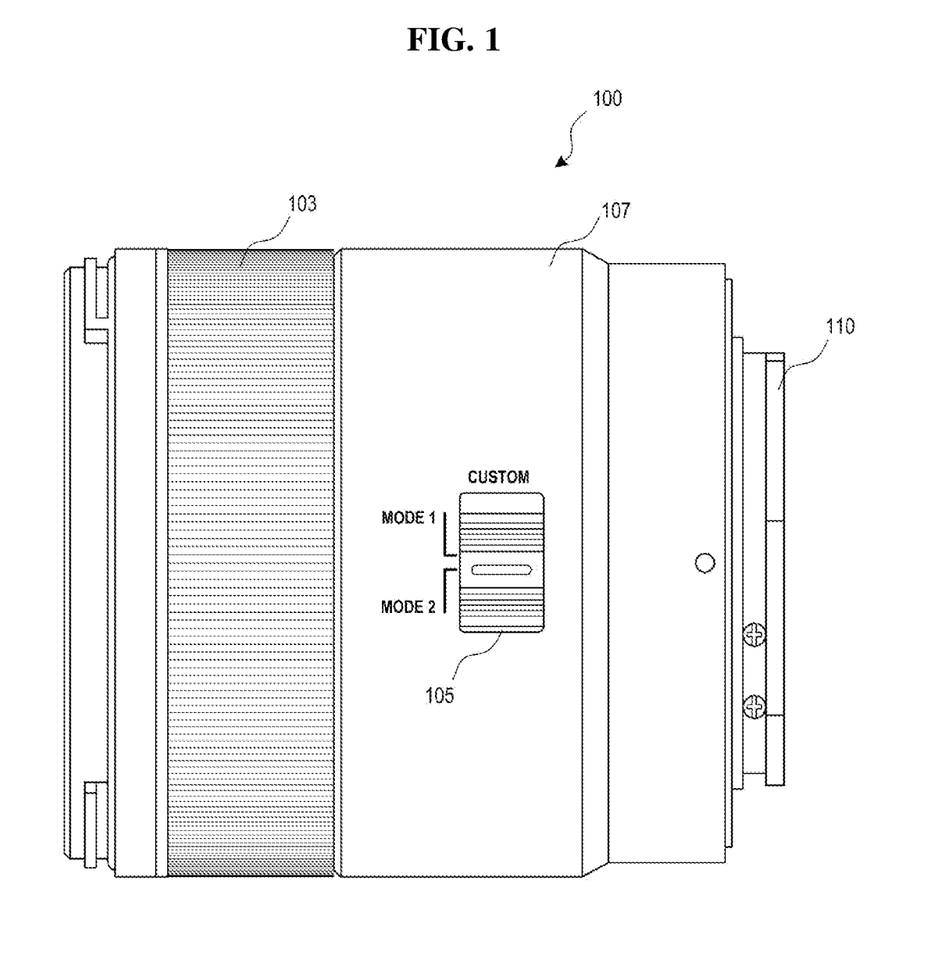
FIG. 1 is a left side view of a camera lens assembly according to an embodiment of the present disclosure.

FIG. 1 is a left side view of a camera lens assembly 100 according to an embodiment of the present disclosure. The camera lens assembly 100 is basically capable of communicating with a camera body and includes a controller and a memory on the inside and a manual ring 103 and a physical switch 105 on the outside. As illustrated in FIG. 1, the switch 105 is in the form of a slider button movable between mode 1 and mode 2, but the present disclosure is not necessarily limited thereto.

In a state where the camera lens assembly 100 is coupled to the camera body, for shooting, a user may hold the camera body with one hand and a lens barrel 107 of the camera lens assembly 100 with the other hand. Here, the user may adjust the scale of a specific function by rotating the manual ring 103 with some of the fingers of the hand holding the lens barrel 107, that is, the thumb and index finger.

The camera lens assembly 100 includes a lens mount 110 provided in a direction toward the camera body for coupling to the camera body. The lens mount 110 is coupled to a camera mount 210 of the camera body which will be described later. Accordingly, the camera lens assembly 100 is physically mounted on the camera body 200. In addition, the camera lens assembly 100 and the camera body 200 are electrically connected to each other so that they can communicate with each other.

Figure 2:
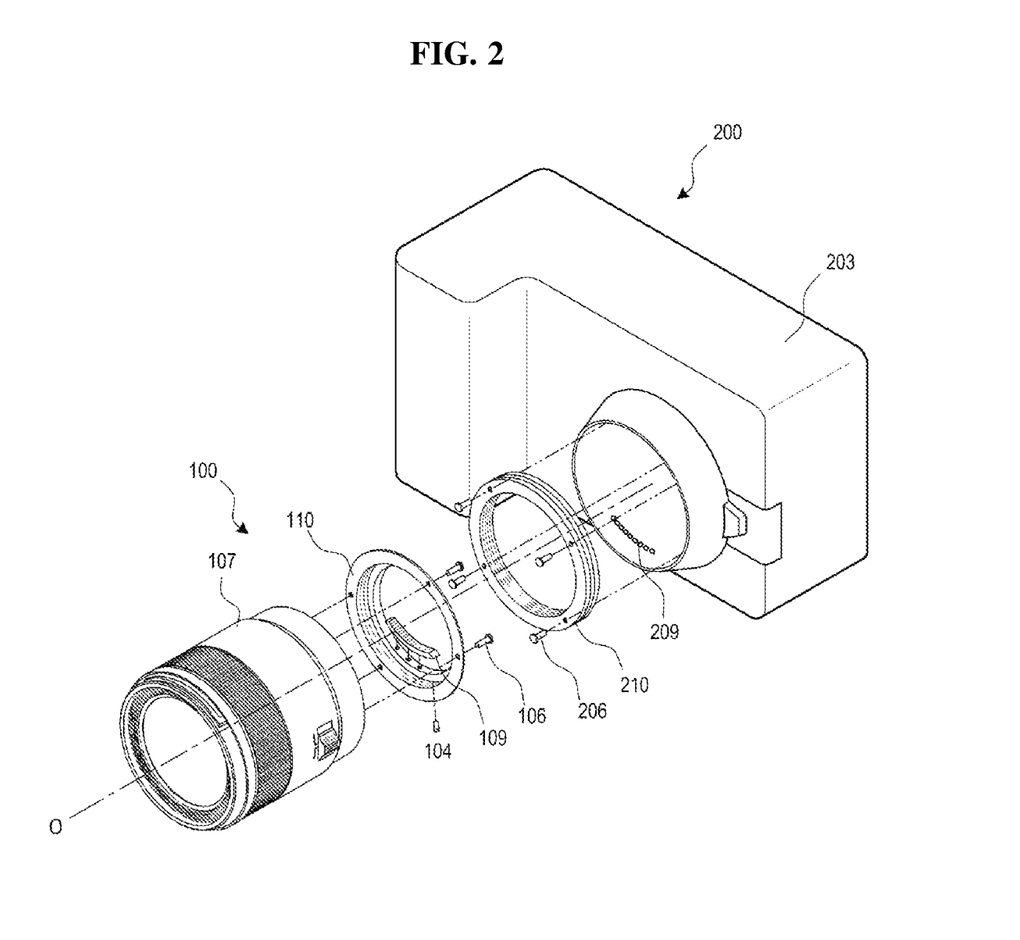
FIG. 2 is an exploded perspective view illustrating the assembled shape of the camera lens assembly and a camera body according to an embodiment of the present disclosure.

FIG. 2 is an exploded perspective view illustrating the assembled shape of the camera lens assembly 100 and the camera body 200 according to an embodiment of the present disclosure. An optical axis O is an axis indicating a center of luminous flux from a subject facing the camera lens assembly 100. The camera lens assembly 100 and the camera body 200 may be fixed to each other by lock pins (not illustrated) in a state where contact surfaces of the lens mount 110 and the camera mount 210 are in contact with each other.

A camera housing 203 is a housing for holding each component of the camera body 200. More specifically, the camera housing 203 includes the camera mount 210, camera-side electrical connectors 209 connecting communication units, and camera mount fixing members 206.

The lens mount 110 is fixed to the lens barrel 107 by lens mount fixing members 106. A lens-side electrical connectors 109 is installed on the camera lens assembly 100 and fixed to the lens mount 110 by fixing members 104. Therefore, when the camera lens assembly 100 and the camera body 200 are assembled, the lens-side electrical connector 109 electrically contacts the camera-side electrical connector 209. Accordingly, the camera lens assembly 100 and the camera body 200 can communicate with each other.

Figure 3:
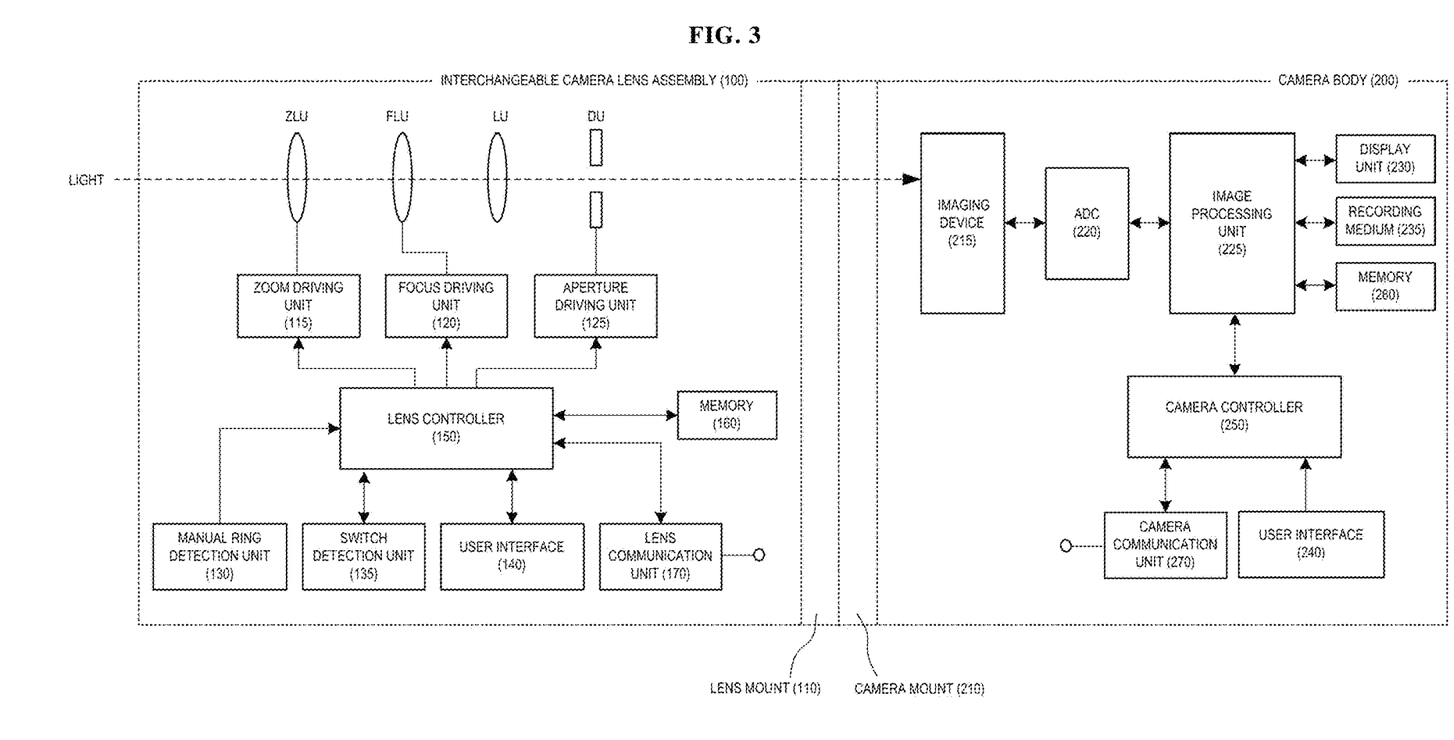
FIG. 3 is a block diagram illustrating the internal configuration of the camera lens assembly and the camera body according to an embodiment of the present disclosure.

FIG. 3 is a block diagram illustrating the internal configuration of the camera lens assembly 100 and the camera body 200 according to an embodiment of the present disclosure.

The camera body 200 includes the camera mount 210 coupled to the lens mount 110 of the camera lens assembly 100 and the camera housing 203 holding a plurality of components such as an imaging device 215.

First, the camera body 200 includes the imaging device 215 which includes a charge coupled device (CCD) or a complementary metal-oxide semiconductor (CMOS) and converts optical information of a subject obtained through the camera lens assembly 100 into an electrical signal. The optical information of the subject obtained by the imaging device 215 is transmitted to an image processing unit 225 via an analog-digital converter (ADC) 220 which converts the analog electrical signal into a digital signal. The image processing unit 225 generates an image signal by performing various image processing on the digital signal, and the image signal (a still image or a moving image) may be displayed on a display unit 230 or recorded on a recording medium 235. In addition, the camera body 200 functions as a buffer when the image signal is processed.

In addition, the camera body 200 includes a camera communication unit 270 which communicates with a lens communication unit 170 of the camera lens assembly 100 and a camera controller 250 which is a CPU for controlling the imaging device 215 or the image processing unit 225. A user may send various commands to the camera controller 250 through a user interface 140.

The camera lens assembly 100 includes the lens barrel 107 and the lens mount 110. Electrical communication between the camera lens assembly 100 and the camera body 200 is performed by the lens communication unit 170 and the camera communication unit 270 including the electrical connectors 109 and 209 electrically connectable to each other. Therefore, various types of information such as power supply and control information can be exchanged between the camera controller 250 and a lens controller 150.

In addition to the lens mount 110, the camera lens assembly 100 may include a zooming lens unit ZLU which moves during zooming, a focusing lens unit FLU which moves during focusing, a fixed lens unit LU which performs a basic optical function, and an aperture unit DU.

The camera lens assembly 100 further includes a zoom driving unit 115 for driving the zooming lens unit ZLU, a focus driving unit 120 for driving the focusing lens unit FLU, and an aperture driving unit 125 for driving the aperture unit DU. In addition, the camera lens assembly 100 includes the lens communication unit 170 and a lens controller 150 which is a CPU for controlling the lens communication unit 170 and the above driving units 115, 120 and 125.

In the camera lens assembly 100, the lens controller 150 also controls a manual ring detection unit 130, a switch detection unit 135, and the user interface 140.

The user interface 140 is used by a user to designate functions represented by a plurality of modes as illustrated in FIG. 1. The functions are designed to control the operation and setting of a camera and include, for example, zooming control, manual focusing, automatic focusing, and aperture control. A specific example of the user interface 140 will be described in more detail with reference to FIG. 4 to be described later.

After designating (defining) the functions represented by the modes, the user may select one of the modes (e.g., a first mode and a second mode) to which the functions have been designated by using the switch 105 of FIG. 1. When the user operates the switch 105 for the selection, the switch detection unit 135 detects the current mode of the switch 105 selected by the user.

After selecting the current mode of the switch 105, the user may rotate the manual ring 103 provided on the outside of the camera lens assembly 100 so that a function corresponding to the current mode can be performed. Accordingly, the manual ring detection unit 130 detects user manipulation according to the rotation of the manual ring 103.

When the operation of the manual ring 103 is detected, the lens controller 150 performs a designated (defined) function according to the detected current mode of the switch 105. Specifically, when a first mode is selected from the modes by the switch 105, the lens controller 150 performs a first function corresponding to the first mode. When a second mode is selected from the modes, the lens controller 150 performs a second function corresponding to the second mode. Here, the first function and the second function may be different from each other and may be designated (defined) by the user through the user interface 140 described above.

For example, the first function may be a function of adjusting the aperture unit DU provided in the camera lens assembly 100, and the second function may be a manual focusing function or an automatic focusing function. In this case, the user can easily adjust the aperture unit DU or the focus unit FLU according to a selected mode by operating the same manual ring 103. In addition, as another example, since focusing through the operation of the manual ring 103 is unnecessary in an automatic focusing state, the aperture unit DU may be adjusted regardless of a mode selected.

Information about a function designated (defined) by the user for each mode through the user interface 140, the detected current mode of the switch 105, or the operation state of the manual ring 105 may be temporarily/permanently stored in a memory 160, and the stored data may be transmitted to the camera body 200 through the lens communication unit 170.

Each component described above with reference to FIG. 3 may be implemented as a software component, such as a task, a class, a subroutine, a process, an object, an execution thread or a program performed in a predetermined region of a memory, or a hardware component, such as a Field Programmable Gate Array (FPGA) or Application Specific Integrated Circuit (ASIC). In addition, the components may be composed of a combination of the software and hardware components. The components may be included in a computer-readable storage medium or may be distributed over a plurality of computers.

In addition, each block may represent a module, segment, or portion of code, which comprises one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Figure 4:
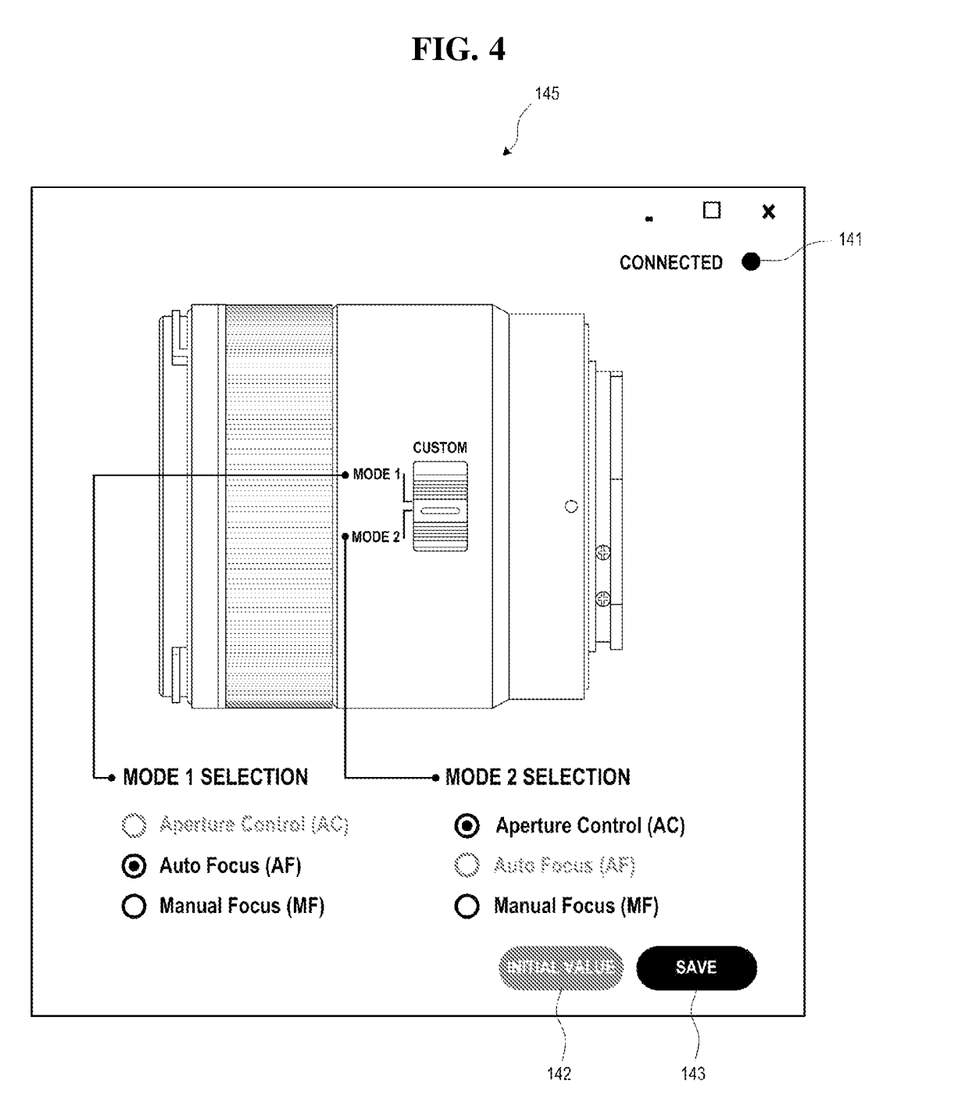
FIG. 4 illustrates an example of a setting screen provided by a user interface so that a user can designate a function for each mode.

FIG. 4 illustrates an example of a setting screen 145 provided by the user interface 140 so that a user can designate (define) a function for each mode. Since it is difficult for the camera lens assembly 100 to have a separate display unit due to its characteristics, the setting screen 145 may be displayed on the display unit 230 when the camera lens assembly 100 is coupled to the camera body 200. However, since setting must be possible regardless of the camera body 200, the setting screen 145 may be displayed on the screen of an external terminal (such as a mobile phone or a PC, not illustrated) connected through wireless communication such as Bluetooth or Wi-Fi or through wired communication such as USB. In this case, the lens communication unit 170 should additionally include a communication module for communication with the external terminal as well as for communication with the camera body 200.

According to a status indicator 141 of FIG. 4, an external terminal and the user interface 140 of the camera lens assembly 100 are currently connected to each other through the lens communication unit 170. Here, items that can be set as MODE 1 and MODE 2 may be composed of the same options. For example, the options include aperture control (AC), auto focus (AF) and manual focus (MF) and can be designated by a user as a first function and a second function, respectively. However, since it is meaningless to designate the same function for two modes, if a function is designated for a corresponding mode, the function is disabled so that it cannot be selected in the other mode. For example, in FIG. 4, the AF currently designated for MODE 1 is disabled (shown in gray) in MODE 2, and the AC currently designated for MODE 2 is disabled (shown in gray) in MODE 1.

After designating a desired function for each mode on the setting screen 145, the user may press a "save" button 143 to update the designation information and store the updated designation information in the memory 160 or may press an "initial value" button 142 to return to designation information previously stored in memory 160.

After designating all the functions corresponding to the modes as illustrated in FIG. 4, the user can precisely adjust an operation value according to a corresponding function simply by positioning the switch 105 in a specific mode and rotating the manual ring 103.

Figure 5:
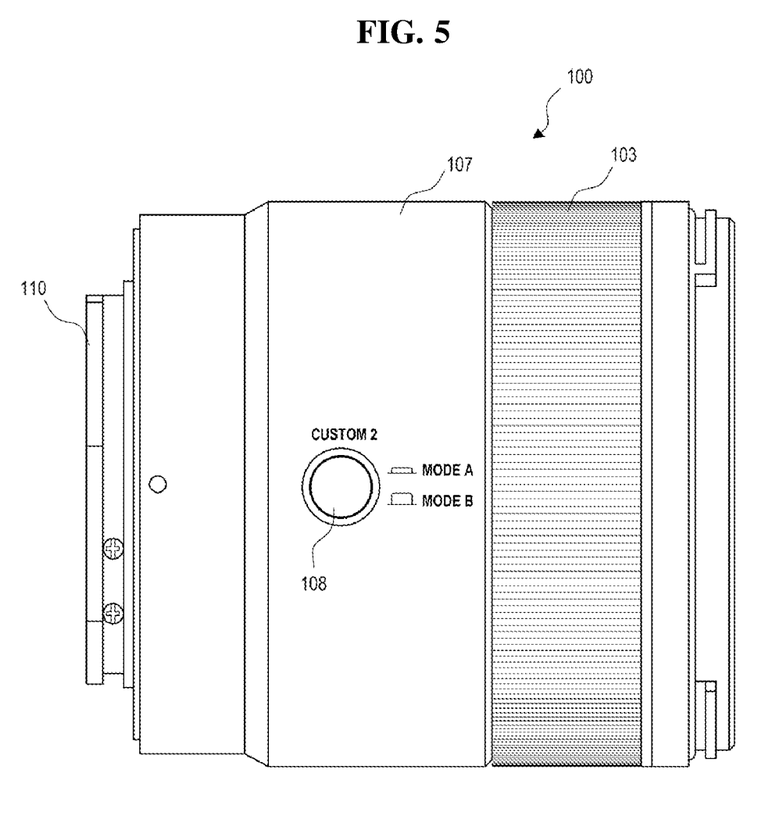
FIG. 5 is a right side view of a camera lens assembly according to another embodiment of the present disclosure.

A case where a user designates desired functions through one mode selection switch 105 has been described above as an example. However, as illustrated in FIG. 5, an additional switch 105 provided separately from the basic switch 105 may be further included so that the user can designate more functions. It is also possible to assign more selection positions to the basic switch 105 without applying the additional switch 105. However, since the user of the camera holds the lens barrel 107 with only one hand during shooting as described above, it is necessary to simplify the operation method as much as possible.

Therefore, the basic switch 105 may be disposed on a left side of the outside of the camera lens assembly 100, and the additional switch 108 may be disposed on a right side of the camera lens assembly 100 to simplify operation. In this case, the switch detection unit 135 of the camera lens assembly 100 can detect both the modes MODE 1 and MODE 2 of the basic switch 105 and the modes MODE A and MODE B of the additional switch 108.

Even in this case, types of the two switches 105 and 108 may be different from each other because operating the two switches 105 and 108 may be confusing if the types of the two switches 105 and 108 are the same. For example, the basic switch 105 may be configured as a slider button, and the additional switch 108 may be configured as a push toggle button.

When the basic switch 105 and the additional switch 108 are used together as described above, it is possible to designate two functions together. For example, when the camera provides various functions such as a zooming function, a focusing function, an aperture control function and an anti-shake function, the camera lens assembly 100 can designate a combination of two of the various functions at once and can adjust an operation value using one manual ring 103 or a plurality of manual rings.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A camera lens assembly capable of communicating with a camera body and an external device, and having a controller and a memory therein, the camera lens assembly comprising:
   a switch for selecting one of a plurality of modes, to which functions have been designated;
   a switch detection unit for detecting a current mode of the switch;
   a manual ring detection unit for detecting an operation of a manual ring provided on the outside of the camera lens assembly so that a user can operate the manual ring by a rotating method; and
   a lens controller for, when the operation of the manual ring is detected, carrying out a designated function according to the detected current mode of the switch, wherein the lens controller performs a first function when a first mode is selected from the modes by the switch and performs a second function when a second mode is selected from the modes by the switch, wherein the first function and the second function are different from each other,
   wherein the lens controller performs wireless communication with the external device having a display that shows a user interface for receiving a user input for designating the functions corresponding to the plurality of modes, and
   wherein the user interface displays options of the first function which can be designated to the first mode and options of the second function which can be designated to the second mode on a display and is used by the user to select one of the options of the first function and one of the options of the second function.

2. The camera lens assembly of claim 1, further comprising a memory for storing information about the functions designated by the user.

3. The camera lens assembly of claim 2, further comprising a lens communication unit for transmitting at least one of the information about the functions stored in the memory, the detected current mode of the switch, and an operation state of the manual ring to the camera body.

4. The camera lens assembly of claim 1, wherein the first function is a function of adjusting an aperture unit provided in the camera lens assembly.

5. The camera lens assembly of claim 4, wherein the second function is a manual focusing function or an automatic focusing function.

6. The camera lens assembly of claim 1, wherein the options of the first function and the options of the second function comprise an aperture control function, a manual focusing function, and an automatic focusing function.

7. The camera lens assembly of claim 6, wherein when one of the options of the first function is selected, the same option as the selected option among the options of the second function is disabled.

8. The camera lens assembly of claim 1, further comprising:
   an additional switch provided separately from the switch, and having a plurality of additional modes, to which additional functions have been designated,
   wherein the switch detection unit detects both the current mode of the switch and a current mode of the additional switch,
   wherein the switch is a slider button positioned on a one side of the outside of the camera lens assembly, and the additional switch is a push toggle button positioned on the other side of the outside of the camera lens assembly.

* * * * *